US011888258B2

(12) United States Patent
Piro et al.

(10) Patent No.: US 11,888,258 B2
(45) **Date of Patent: *Jan. 30, 2024**

(54) SEALED ELECTRICAL CONNECTOR

(71) Applicant: Honeywell International Inc., Charlotte, NC (US)

(72) Inventors: Domenico Piro, Trieste (IT); Gianluca Pace, Trieste (IT); Mauro Miheli, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,105

(22) Filed: Mar. 14, 2023

(65) Prior Publication Data

US 2023/0216235 A1 Jul. 6, 2023

Related U.S. Application Data

(63) Continuation of application No. 17/335,507, filed on Jun. 1, 2021, now Pat. No. 11,605,916.

(51) Int. Cl.

| | |
|---|---|
| ***H01R 12/52*** | (2011.01) |
| ***H01R 13/52*** | (2006.01) |
| ***G08B 17/107*** | (2006.01) |

(52) U.S. Cl.

CPC ....... *H01R 13/5202* (2013.01); *G08B 17/107* (2013.01); *H01R 12/52* (2013.01); *H01R 2201/20* (2013.01)

(58) Field of Classification Search

None

See application file for complete search history.

(56) References Cited

U.S. PATENT DOCUMENTS

| | | | | |
|---|---|---|---|---|
| 4,914,555 A | 4/1990 | Gammache | | |
| 5,427,535 A | 6/1995 | Sinclair | | |
| 6,174,172 B1 | 1/2001 | Kazama | | |
| 6,497,582 B1 | 12/2002 | Hoffmeyer | | |
| 8,598,963 B2 | 12/2013 | Courselle et al. | | |
| 8,956,193 B2 * | 2/2015 | Tran | G01R 3/00 | 439/700 |
| 9,039,448 B2 * | 5/2015 | Mason | H01R 13/2421 | 439/607.09 |
| 9,134,716 B2 | 9/2015 | Cole et al. | | |

(Continued)

FOREIGN PATENT DOCUMENTS

| | | |
|---|---|---|
| CN | 1256411 A | 6/2000 |
| CN | 1449075 A | 10/2003 |

(Continued)

*Primary Examiner* — Tho D Ta

(74) *Attorney, Agent, or Firm* — Brooks, Cameron & Huebsch, PLLC

(57) ABSTRACT

Devices and methods for a sealed electrical connector are described herein. Some embodiments include a spring connecting a first PCB to a second PCB, wherein the spring includes a first end portion in contact with the first PCB, a second end portion in contact with the second PCB, and a middle portion extending between the first end portion and the second end portion, a spacer surrounding the middle portion of the spring, a first seal seated in a first groove of the spacer and in contact with the first PCB, and a second seal seated in a second groove of the spacer and in contact with the second PCB.

19 Claims, 9 Drawing Sheets

(56) References Cited

U.S. PATENT DOCUMENTS

| | | | |
|---|---|---|---|
| 9,196,983 B2 | 11/2015 | Saur et al. | |
| 9,824,564 B2 | 11/2017 | Bressanutti et al. | |
| 10,115,280 B2 | 10/2018 | Bressanutti et al. | |
| 10,877,011 B2 | 12/2020 | Cummings et al. | |
| 11,605,916 B2 * | 3/2023 | Piro | H01R 13/73 |
| 2004/0157476 A1 | 8/2004 | Maldonado et al. | |
| 2006/0009055 A1 | 1/2006 | Li | |
| 2008/0143356 A1 | 6/2008 | Brodsky | |
| 2011/0207343 A1 | 8/2011 | Tsai | |
| 2018/0277970 A1 | 9/2018 | Shah | |
| 2020/0116688 A1 | 4/2020 | Bertini et al. | |

FOREIGN PATENT DOCUMENTS

| | | | | |
|---|---|---|---|---|
| EP | 0696787 B1 | 6/1999 | | |
| JP | 2004296301 A | 10/2004 | | |
| WO | WO-2011058646 A1 * | 5/2011 | G01R 1/06722 | |

* cited by examiner

SEALED ELECTRICAL CONNECTOR

PRIORITY INFORMATION

This application is a Continuation of U.S. application Ser. No. 17/335,507, filed on Jun. 1, 2021, which published as U.S. Publication No. 2022-0384985 A1 on Dec. 1, 2021 and will issue as U.S. Pat. No. 11,605,916 on Mar. 14, 2023, the contents of which are incorporated herein by reference.

TECHNICAL FIELD

The present disclosure relates to devices and methods for a sealed electrical connector.

BACKGROUND

Electrical components, such as printed circuit boards (PCBs) may be connected by electrical connectors. Some environments may be particularly harsh on electrical connectors. For instance, electrical connectors exposed to air pollution may be prone to contamination, oxidation, and/or corrosion.

DETAILED DESCRIPTION

Figure 1A:
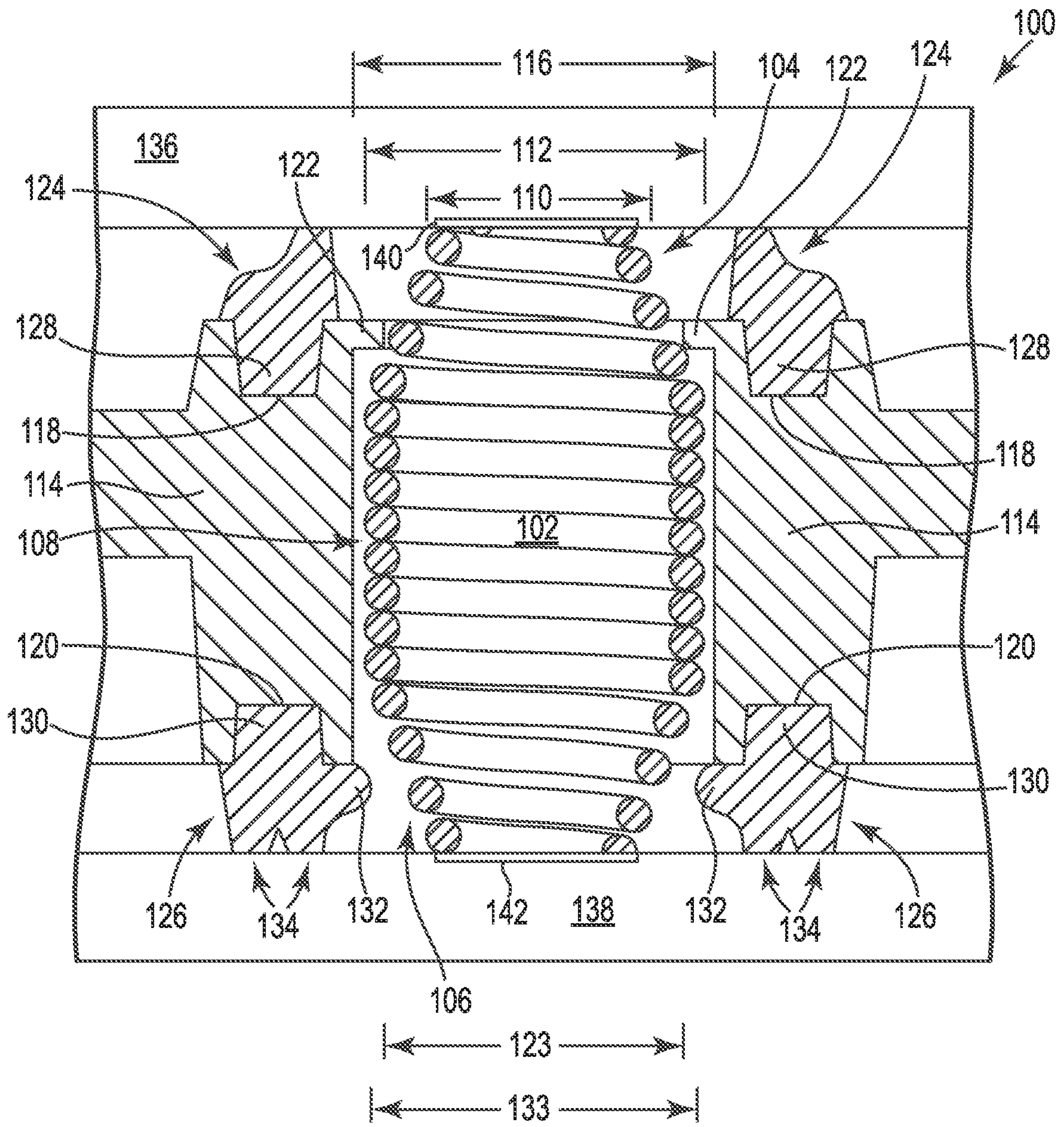
FIG. 1A is a cross-sectional view of a sealed electrical connector in accordance with one or more embodiments of the present disclosure.

Devices and methods for a sealed electrical connector are described herein. For example, one or more embodiments include a spring connecting a first PCB to a second PCB, wherein the spring includes a first end portion in contact with the first PCB, a second end portion in contact with the second PCB, and a middle portion extending between the first end portion and the second end portion, a spacer surrounding the middle portion of the spring, a first seal seated in a first groove of the spacer and in contact with the first PCB, and a second seal seated in a second groove of the spacer and in contact with the second PCB.

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The sensor can sample the gas in order to determine whether the gas includes smoke particles. In response to detection of smoke particles, the aspirating smoke detector device can transmit a signal to a control panel in the facility to signal detection of smoke particles.

Sealed electrical connectors in accordance with the present disclosure can be used to connect electrical components of aspirating smoke detector devices, where air pollution would be likely to cause contamination, oxidation, and/or corrosion in unsealed (e.g., unprotected) electrical connectors. For purposes of illustration, embodiments herein may be discussed in the context of aspirating smoke detector devices. However, it is noted that the present disclosure is not so limited. Sealed electrical connectors in accordance with embodiments herein can be used to connect electrical components of any suitable device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

As used herein, "a", "an", or "a number of" something can refer to one or more such things, while "a plurality of" something can refer to more than one such things. For example, "a number of components" can refer to one or more components, while "a plurality of components" can refer to more than one component.

Figure 1B:
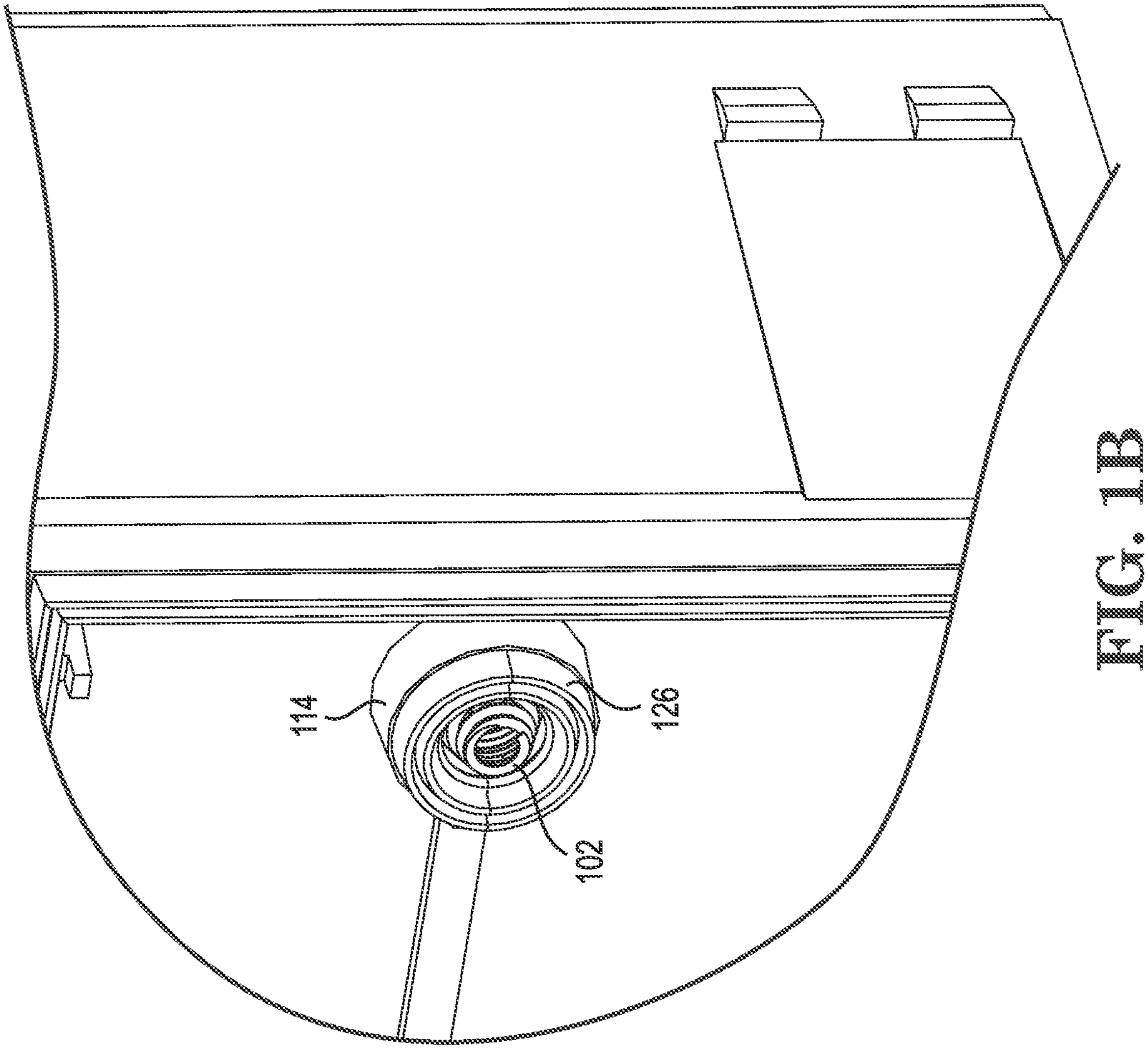
FIG. 1B is an isometric view of a sealed electrical connector in accordance with one or more embodiments of the present disclosure.
Figure 1C:
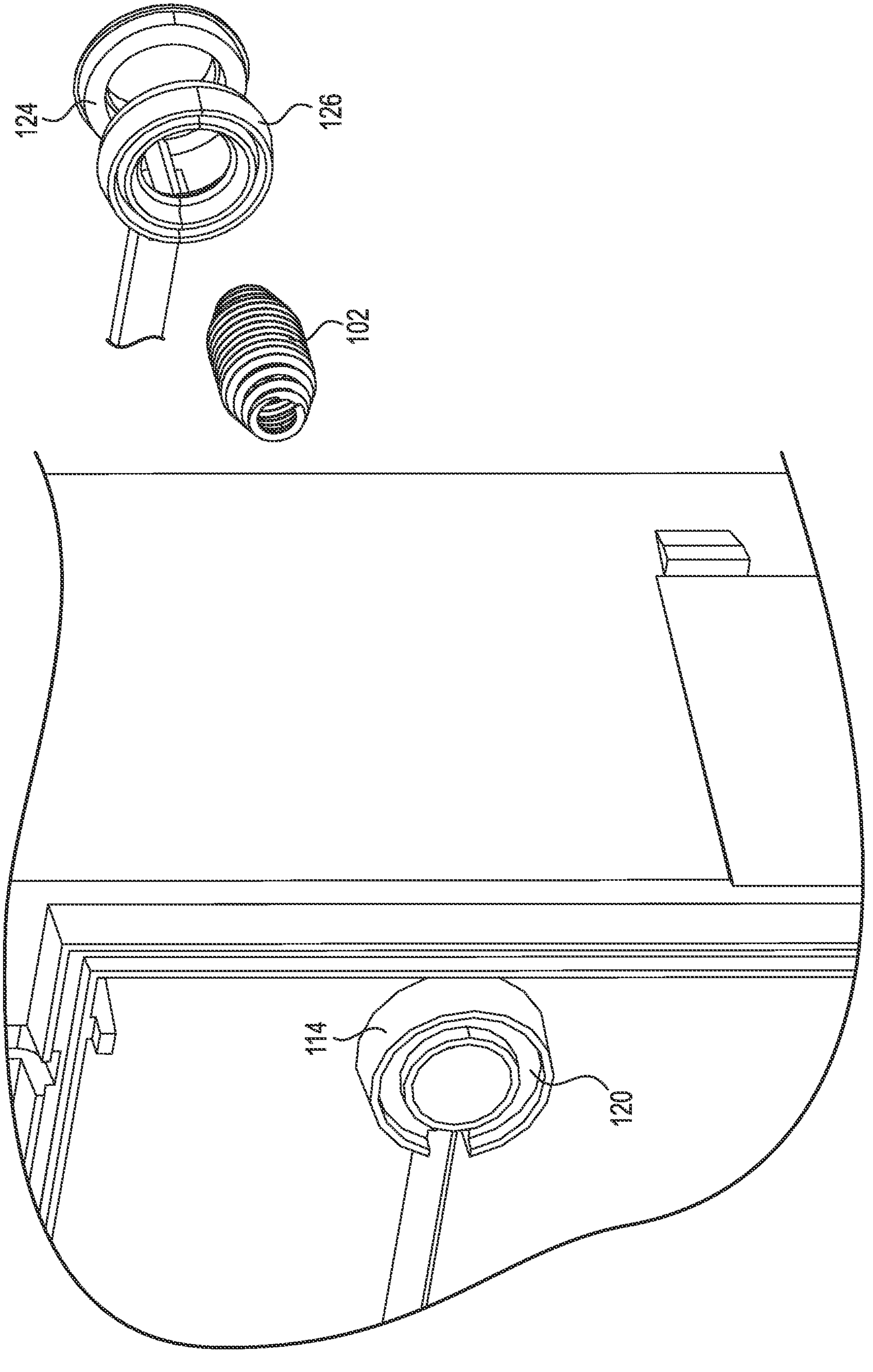
FIG. 1C is an exploded isometric view of a sealed electrical connector in accordance with one or more embodiments of the present disclosure.

FIG. 1A is a cross-sectional view of a sealed electrical connector 100 (sometimes referred to herein simply as "connector 100") in accordance with one or more embodiments of the present disclosure. FIG. 1B is an isometric view of a sealed electrical connector in accordance with one or more embodiments of the present disclosure. FIG. 1C is an exploded isometric view of a sealed electrical connector in accordance with one or more embodiments of the present disclosure. FIGS. 1A, 1B, and 1C may be cumulatively referred to herein as "FIG. 1."

As shown in FIG. 1, the connector includes a spring 102 extending between a first spring contact point 140 (sometimes referred to herein simply as "first contact 140") of a first PCB 136 and a second spring contact point 142 (sometimes referred to herein simply as "second contact 142") of a second PCB 138. The spring is at least partially compressed, as shown in FIG. 1A, to provide reliable contact with the first contact 140 and the second contact 142.

The spring 102 can be a double conic spring, as shown in FIG. 1, though it is noted that embodiments herein are not so limited. In the example illustrated in FIG. 1, the spring 102 includes a middle portion 108 and two opposing end portions: a first end portion 104 and a second end portion 106. The middle portion 108 includes a plurality of coils of a first diameter 112. As shown in FIG. 1, each of the first end portion 104 and the second end portion 106 can include a plurality of coils that taper in diameter from the first diameter 112 to a second diameter 110 at their respective terminal ends. In some embodiments, the first end portion 104 and the second end portion 106 taper to different diameters. The size of the second diameter 110 can be selected based on a size of the first contact 140 and/or the second contact 142. It should be appreciated that the first contact 140 and the second contact 142 can be a same size or different sizes. Additionally, it is noted that while the middle portion 108 is shown as having a substantially continuous diameter 112, embodiments herein are not so limited; the diameter 112 of the middle portion 108 may taper or otherwise vary along a length of the middle portion 108. In some embodiments, the spring 102 is made of a tinned phosphorous bronze material. In some embodiments, a material comprising the spring 102 is selected based on a material comprising the first contact 140 and/or the second contact 142. In some embodiments, the spring 102, the first contact 140, and the second contact 142 are made of a same material. Utilizing a same material (e.g., a same alloy) can reduce galvanic corrosion and can increase conductivity through the connector 100 by reducing capacitance and/or resistance.

The first PCB 136 and the second PCB 138 can be substantially parallel, as shown in FIG. 1A, though it is noted that embodiments herein are not so limited. The first PCB 136 and the second PCB 138 can be at a different angle and/or position with respect to one another. As used herein, the term "PCB" refers to a device to mechanically support and electrically connect electrical components via conductive traces. In the example of an aspirating smoke detector device, the first PCB 136 and/or second PCB 138 can include electrical components utilized in detection of smoke via the aspirating smoke detector device. For example, an aspirating smoke detector device can include a blower and sensor head housings. The first PCB 136 and/or second PCB 138 can be utilized to control the blower (e.g., the speed of the blower), receive signals from the sensor head housings, etc. The first PCB 136 and/or second PCB 138 can, accordingly, be utilized to control operation of the aspirating smoke detector device to detect smoke particles in a gas flowing through the aspirating smoke detector device and transmit a signal to a control panel in response to detection of smoke particles in the gas. The first PCB 136 and/or second PCB 138 can include buttons, light emitting diodes (LEDs), and/or other electrical components known to those of skill in the art.

The middle portion 108 of the spring 102 is surrounded by a spacer 114. In the example of an aspirating smoke detector device, the spacer 114 is a portion of a manifold (e.g., integrated in the manifold 102, discussed below). As used herein, the term "manifold" refers to a device including at least one inlet and at least one outlet. For example, a manifold can make up a portion of the aspirating smoke detector device and can include various parts, including a flow path, a blower housing, a first sensor head housing, and a second sensor head housing, as are further described herein.

The spacer 114 can be manufactured of a plastic material. For example, the spacer 114 can be manufactured from acrylonitrile butadiene styrene (ABS) plastic, poly(methyl methacrylate) (PMMA) plastic, thermoplastic elastomers (TPE), among other types of plastic materials. The spacer 114 can be manufactured via multi-shot molding techniques, among other manufacturing techniques.

The spacer 114 can define a cylindrical opening. For instance, the spacer 114 can include an inner surface defining a lumen having a diameter 116. The diameter 116 can exceed the diameter 112 of the middle portion 108 of the spring 102 such that the spring 102 can be inserted into the lumen. The diameter 116 may be selected to exceed the diameter 112 of the middle portion 108 by a relatively small amount (e.g., 1% to 10%) to prevent the spring 102 from overturning and/or moving within the spacer 114, which could cause contact with the first contact 140 and/or second contact 142 to be lost.

As previously discussed, the middle portion 108 of the spring 102 is surrounded by the spacer 114. In some embodiments, portions of the first end portion 104 and/or second end portion 106 are also surrounded by the spacer 114. In the example illustrated in FIG. 1, the first end portion 104 is surrounded by a first seal 124 and the second end portion 106 is surrounded by a second seal 126.

The first seal 124 and the second seal 126 can be made of a thermoplastic rubber material. Some embodiments can include over-molding the first seal 124 and/or the second seal 126 to the spacer 114. The first seal 124 and the second seal 126 can be seated in grooves. For example, the first seal 124 can include a first seating portion 128 configured to seat in a first groove 118. The second seal 126 can include a second seating portion 130 configured to seat in a second groove 120. Each of the first seal 124 and the second seal 126 can be compressed as the first PCB 136 is brought nearer to the second PCB 138. Accordingly, the spring 102 is hermetically sealed from outside air, smoke particles, and/or pollution by a combination of the spacer 114, the first seal 124, the second seal 126, the first PCB 136, and the second PCB 138.

As shown in FIG. 1, the second seal 126 includes a plurality of fins 134. In some embodiments, the first seal 124 also includes a plurality of fins. Fins can be utilized to provide redundant and/or more reliable sealing from outside air. It is noted that some embodiments may not contain fins and that other features may be utilized to enhance sealing efficacy and may be dependent on the particular material used for the first seal 124 and/or the second seal 126.

Embodiments herein can include components configured to retain the spring 102 within the lumen of the spacer 114. Such retention may be utilized during manufacture and/or assembly, for instance. As shown in FIG. 1, the spacer 114 can include an annular projection 122. The annular projection 122 may be alternatively referred to as "ledge 122." Ledge 122 can define a retaining diameter 123. The retaining diameter 123 is smaller than the diameter 112 of the middle portion of the spring 102 and larger than the diameter 110 of the first end portion 104. Accordingly, the spring 102 can be prevented from being removed from the lumen (e.g., from above) by the ledge 122. Such a configuration may be utilized in instances where the first PCB 136 is added (e.g., added last) to an assembly that includes the second PCB 138, the spacer 114, the first seal 124, and the second seal 126. In some embodiments, retention can be provided by one of the seals. For instance, as shown in FIG. 1, the second seal 126 can include a retaining lip 132. The retaining lip 132 can define a lip diameter 133. The lip diameter 133 is smaller than the diameter 112 of the middle portion of the spring 102 and larger than the diameter 110 of the second end portion 104. Accordingly, the spring 102 can be prevented from being removed from the lumen (e.g., from below) by the retaining lip 132. Such a configuration may be utilized in instances where the second PCB 138 is added (e.g., added last) to an assembly that includes the first PCB 136, the spacer 114, the first seal 124, and the second seal 126. In some embodiments, the thermoplastic rubber material of the second seal 126 may allow the spring 102 to be inserted (e.g., pressed) into the lumen of the spacer 114 by temporarily deforming to a diameter sufficiently large to accept the middle portion 108 (e.g., a diameter temporarily larger than the lip diameter 133. Thereafter, the retaining lip returns to its normal shape and/or dimensions such that the lip diameter 133 is restored and the spring 102 is retained.

Figure 2:
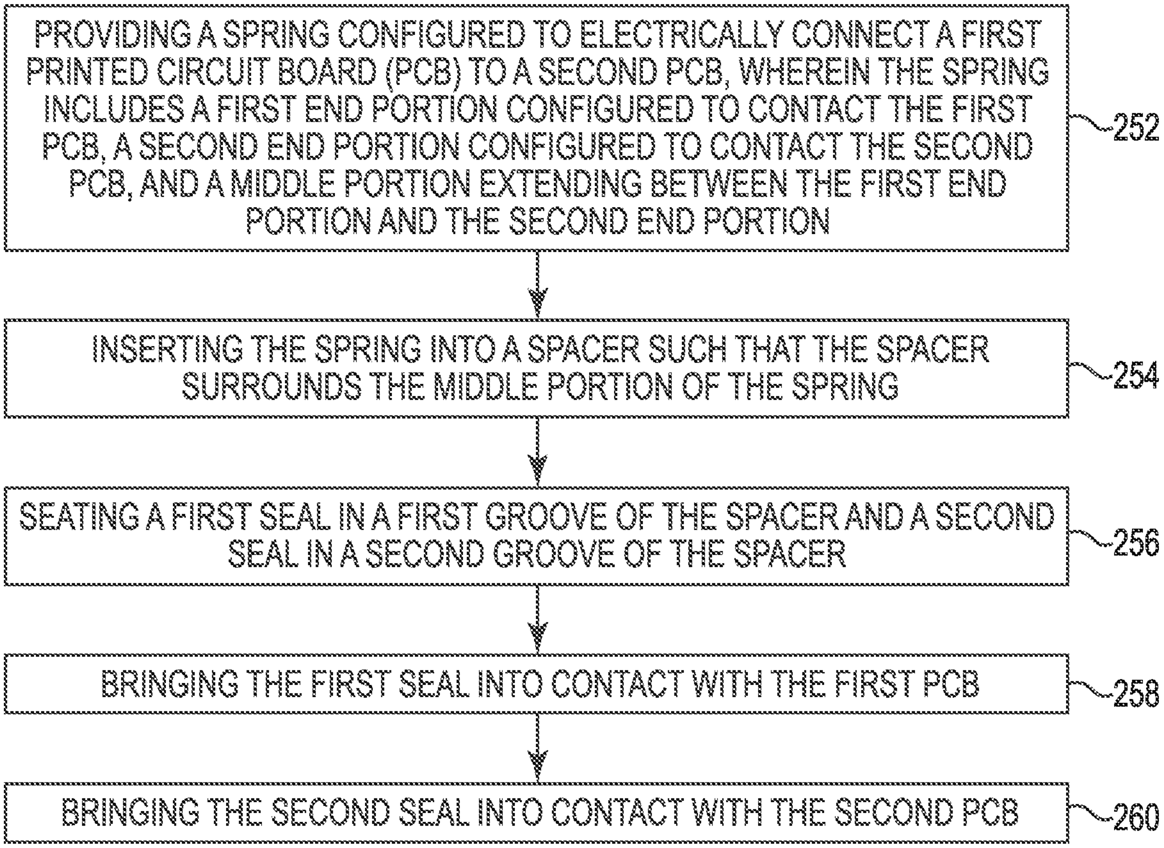
FIG. 2 is an example of a method of manufacturing a sealed electrical connector in accordance with one or more embodiments of the present disclosure.

FIG. 2 is an example of a method of manufacturing a sealed electrical connector in accordance with one or more embodiments of the present disclosure. At 252, the method includes providing a spring configured to electrically connect a first printed circuit board (PCB) to a second PCB. In some embodiments, the spring includes a first end portion configured to contact the first PCB, a second end portion configured to contact the second PCB, and a middle portion extending between the first end portion and the second end portion. The spring can be analogous to the spring 102, previously described in connection with FIG. 1.

At 254, the method includes inserting the spring into a spacer such that the spacer surrounds the middle portion of the spring. Some embodiments can include inserting the spring into a lumen defined by an inner surface of the spacer. As previously discussed, the spacer can include an annular projection defining a ledge that retains the spring in the lumen. In some embodiments, at least one of the first and second seals includes a retaining lip that retains the spring in the lumen.

At 256, the method includes seating a first seal in a first groove of the spacer and a second seal in a second groove of the spacer. The method can include over-molding the first and/or second seal to the spacer. In some embodiments, the method includes force-fitting the first and/or second seals in the groove(s). The seals can be, for example, thermoplastic rubber seals.

At 258, the method includes bringing the first seal into contact with the first PCB, and, at 260, bringing the second seal into contact with the second PCB. The PCBs can be brought into contact with the seals and with the spring 102 such that the seals are at least partially compressed around their entire circumference. In some embodiments, the PCBs are between 10 and 12 millimeters apart. For example, in some embodiments, the PCBs are approximately 11 millimeters apart. The PCBs can be attached to larger components (e.g., manifolds, housings, etc.). In some embodiments, these components are secured together by one or more suitable fasteners.

Figure 3:
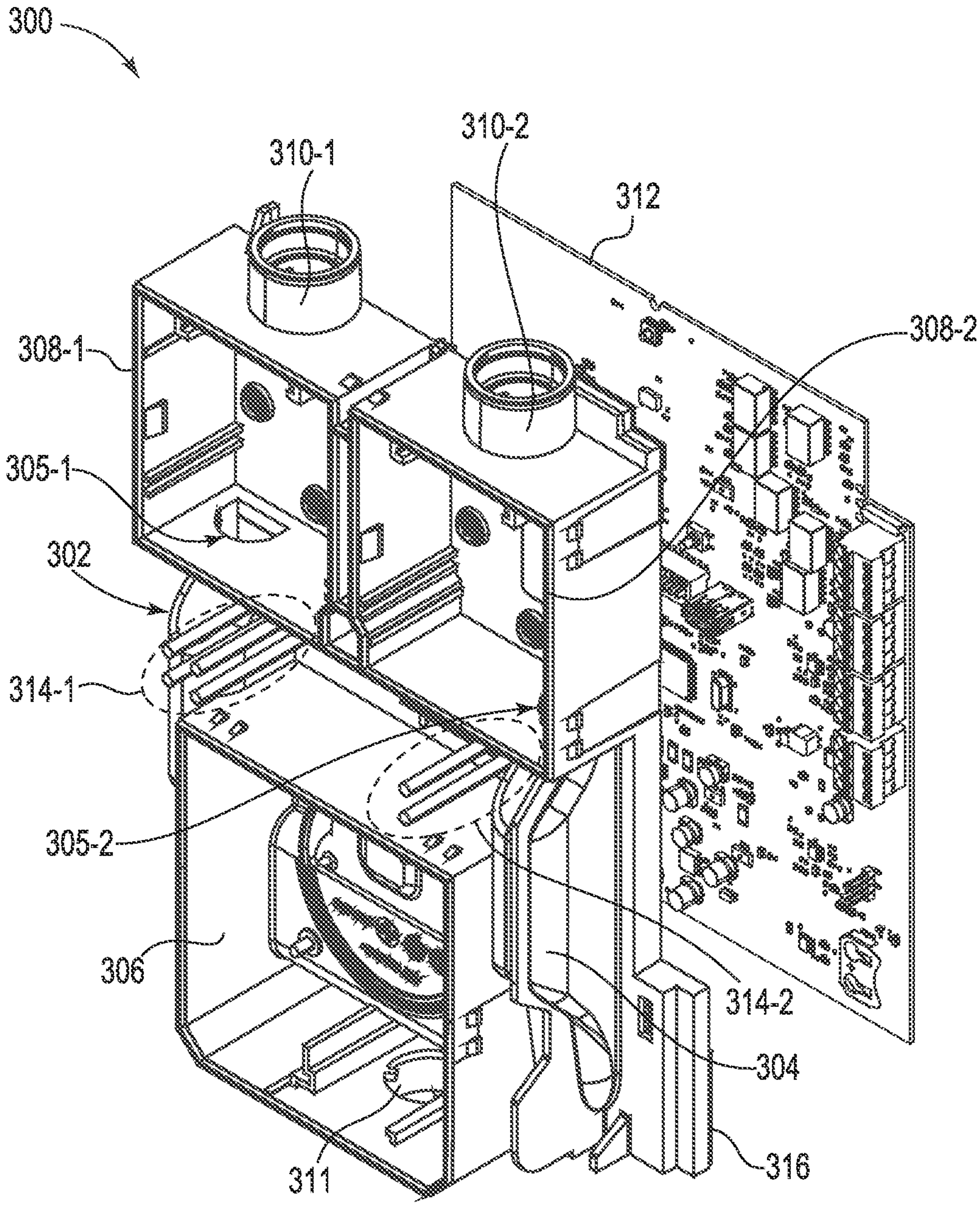
FIG. 3 is an exploded view of an example of a portion of an aspirating smoke detector device, in accordance with one or more embodiments of the present disclosure.

FIG. 3 is an exploded view of an example of a portion of an aspirating smoke detector device 300, in accordance with one or more embodiments of the present disclosure. The aspirating smoke detector device 300 can include a manifold 302 and a PCB 312.

As illustrated in FIG. 3, the aspirating smoke detector device 300 can include a printed circuit board (PCB) 312. As used herein, the term "PCB" refers to a device to mechanically support and electrically connect electrical components via conductive traces. The PCB 312 can, therefore, include electrical components utilized in detection of smoke via the aspirating smoke detector device 300. For example, although not illustrated in FIG. 1 for clarity and so as not to obscure embodiments of the present disclosure, the aspirating smoke detector device 300 can include a blower and sensor head housings. The PCB 312 can be utilized to control the blower (e.g., the speed of the blower), receive signals from the sensor head housings, etc. The PCB 312 can, accordingly, be utilized to control operation of the aspirating smoke detector device 300 to detect smoke particles in a gas flowing through the aspirating smoke detector device 300 and transmit a signal to a control panel in response to detection of smoke particles in the gas. The PCB 312 can include buttons (e.g., not illustrated in FIG. 3), light emitting diodes (LEDs), among other electrical components.

As shown in the exploded view of FIG. 3, the aspirating smoke detector device 300 can further include a manifold 302. As used herein, the term "manifold" refers to a device including at least one inlet and at least one outlet. For example, the manifold 302 can make up a portion of the aspirating smoke detector device 300 and can include various parts, including a flow path 304, a blower housing 306, a first sensor head housing 308-1, and a second sensor head housing 308-2, as are further described herein.

The manifold 302 can be manufactured of a plastic material. For example, the manifold 302 can be manufactured from acrylonitrile butadiene styrene (ABS) plastic, poly(methyl methacrylate) (PMMA) plastic, thermoplastic elastomers (TPE), among other types of plastic materials. Further, the manifold 302 can be made of any other type of material (e.g., metal, carbon fiber, etc.). The manifold 302 can be manufactured via multi-shot molding techniques, for instance.

A flow path 304 can be included as part of the manifold 302. The flow path 304 can include a first flow channel 305-1 and a second flow channel 305-2 (referred to collectively herein as flow channels 305). The flow channels 305 can allow for the flow of gas through the aspirating smoke detector device 300. For instance, gas can flow into and out of different portions of the aspirating smoke detector device 300 through the flow channels 305 for smoke detection, as is further described herein.

The manifold 302 can include light pipes 314-1 and 314-2. As used herein, the term "light pipe" refers to a device to transmit light for the purpose of illumination. The light pipes 314 can be of a transparent material to allow light (e.g., from an LED of the PCB 312) to be transmitted. The light pipes 314-1 can be in a 2×2 array configuration and the light pipes 314-2 can be in a 1×1 array configuration.

The manifold 302 can include a blower housing 306. The blower housing 306 can be configured to receive a blower (e.g., not illustrated in FIG. 3). The blower can operate to draw gas into and cause gas to flow through the aspirating smoke detector device 300. The blower housing 306 can include a blower housing outlet 311. The gas flowing through the aspirating smoke detector device 300 can exit the aspirating smoke detector device through the blower housing outlet 311.

The first flow channel 305-1 can connect the blower housing 306 to a first sensor head housing 308-1. The first sensor head housing 308-1 can be configured to receive a sensor head (e.g., not illustrated in FIG. 3). The first sensor head housing 308-1 can include a first sensor head housing inlet 310-1. The blower can operate to draw gas into a sensor head located in the first sensor head housing 308-1 via the first sensor head housing inlet 310-1 and out of the first sensor head housing 308-1 via the first flow channel 305-1 for detection of smoke particles in the gas.

Similar to the first flow channel 305-1, the second flow channel 305-2 can connect the blower housing 306 to a second sensor head housing 308-2. The second sensor head housing 308-2 can also be configured to receive a sensor head (e.g., not illustrated in FIG. 3). The second sensor head housing 308-2 can include a second sensor head housing inlet 310-2. The blower can operate to draw gas into another sensor head located in the second sensor head housing 308-2 via the second sensor head housing inlet 310-2 and out of the second sensor head housing 308-2 via the second flow channel 305-2 for detection of smoke particles in the gas.

As illustrated in FIG. 3, the manifold 302 can further include a gasket 316. As used herein, the term "gasket" refers to a device located around an area of another device to make the area impervious to the transition of fluid through or around the device. For example, the gasket 316 can be located on a "back" side of the manifold 302 which is to interface (e.g., rest against) the PCB 312. The gasket 316 can fluidically seal the manifold 302 to the PCB 312, as is further described in connection with FIG. 4.

Figure 4:
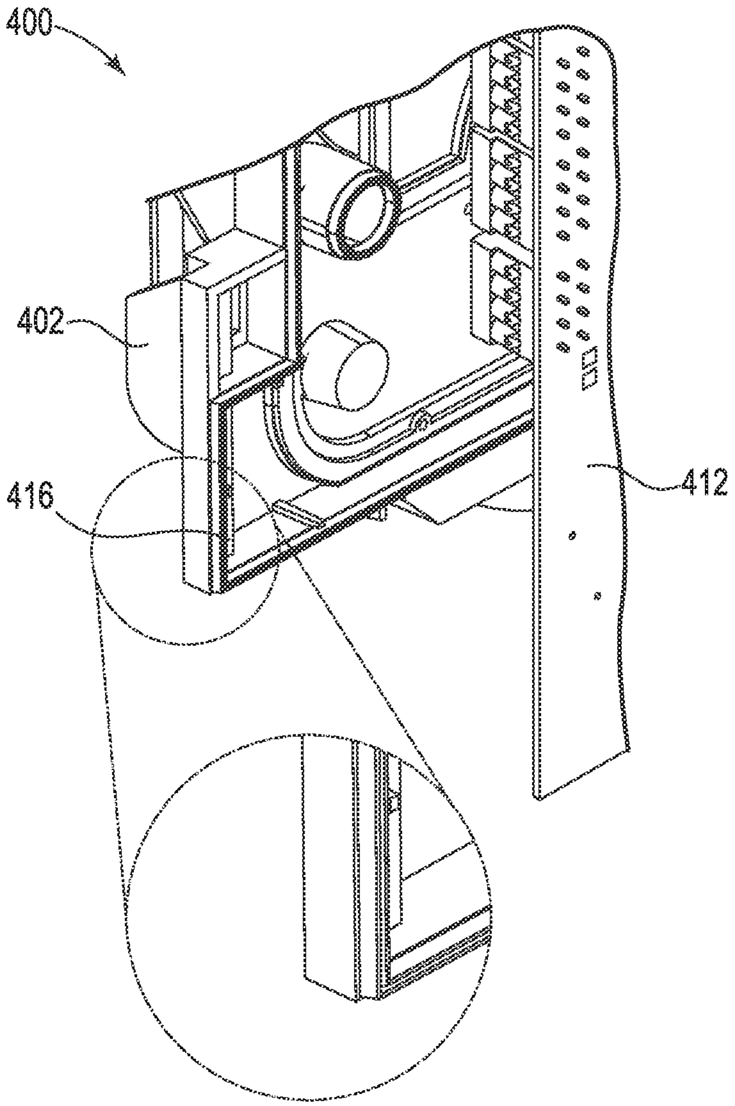
FIG. 4 is an exploded view of an example of a manifold and a printed circuit board (PCB) of an aspirating smoke detector device, in accordance with one or more embodiments of the present disclosure.

FIG. 4 is an exploded view of an example of a manifold 402 and a printed circuit board (PCB) 412 of an aspirating smoke detector device 400, in accordance with one or more embodiments of the present disclosure. The manifold 402 can include a gasket 416.

As previously described in connection with FIG. 3, the manifold 402 can include a gasket 416. The gasket 416 can be utilized to fluidically seal the manifold 402 to the PCB 412. For example, when the aspirating smoke detector device 400 is assembled, the manifold 402 can be positioned adjacent to (e.g., resting against) the PCB 412. When the manifold 402 is positioned adjacent to the PCB 412, the gasket 416 can be compressed against the PCB 412 to cause the gasket 416 to fluidically seal the manifold 402 to the PCB 412.

In some examples, the gasket 416 can be a thermo-plastic rubber gasket. The gasket 416 can be created on the manifold 402 via molding techniques, for instance. Further, although the gasket 416 is described as a thermo-plastic rubber gasket, embodiments of the present disclosure are not so limited. For example, the gasket 416 can be any other material that can fluidically seal the manifold 402 to the PCB 412.

Fluidically sealing the manifold 402 to the PCB 412 can prevent substances from transiting between the gasket 416 into a space between the manifold 402 and the PCB 412. Such a fluidically sealed space can prevent moisture from entering the space. Accordingly, the gasket 416 can guard against moisture interacting with the PCB 412, preventing shorting of the electrical components of the PCB 412, preventing corrosion of the PCB 412, etc.

Figure 5:
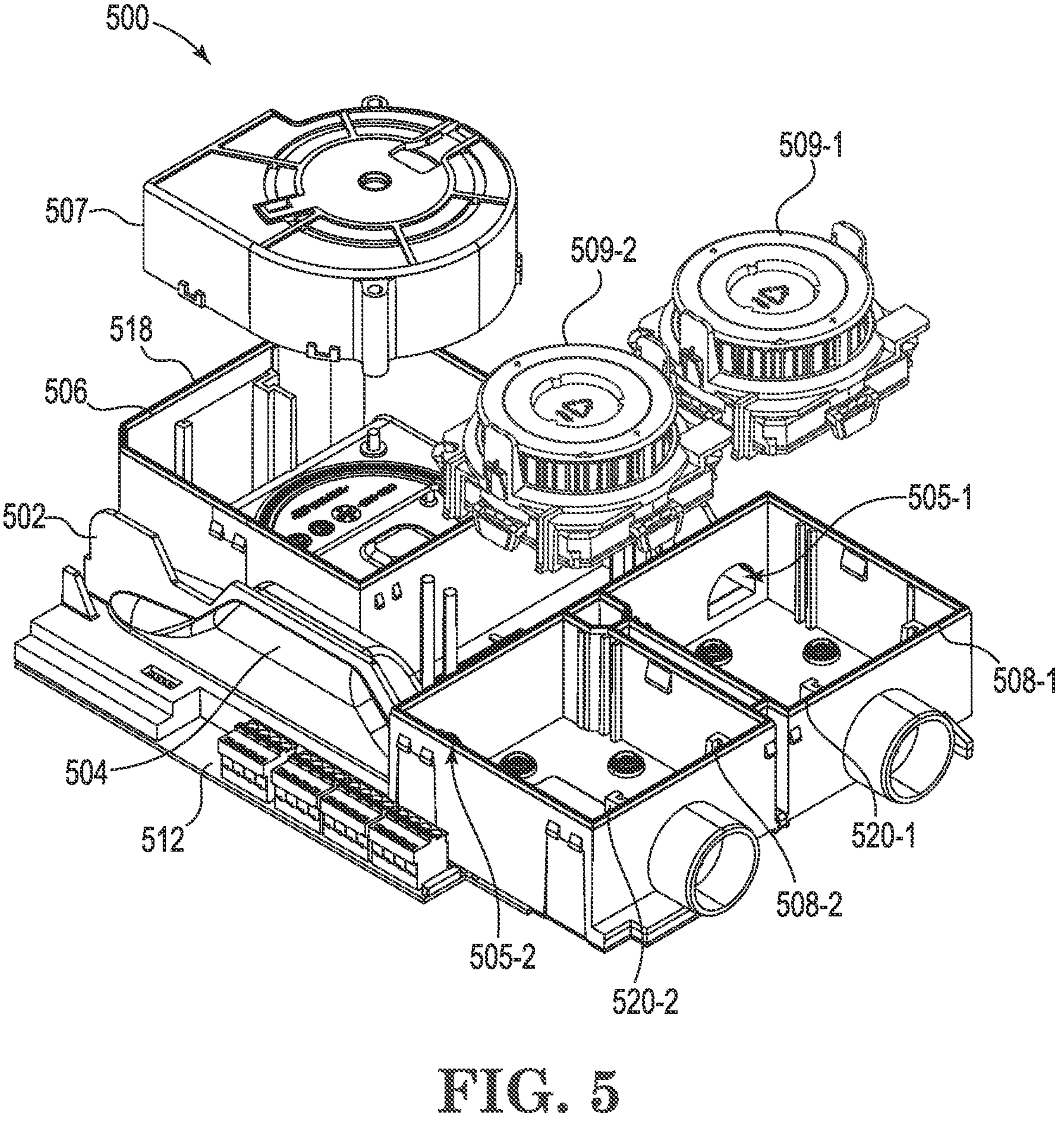
FIG. 5 is an exploded view of an example of a manifold, a blower, and sensor heads of an aspirating smoke detector device, in accordance with one or more embodiments of the present disclosure.

FIG. 5 is an exploded view of an example of a manifold 502, a blower 507, and sensor heads 509 of an aspirating smoke detector device 500, in accordance with one or more embodiments of the present disclosure. The aspirating smoke detector device 500 can include a manifold 502.

As previously described in connection with FIG. 3, the aspirating smoke detector device 500 can include a manifold 502, the manifold including a flow path 504, a blower housing 506, a first sensor head housing 508-1, and a second sensor head housing 508-2. The manifold 502 can cover the PCB 512. The flow path 504 can include the first flow channel 505-1 and the second flow channel 505-2.

As illustrated in FIG. 5, the manifold 502 can include the blower housing 506. The blower housing 506 is configured to receive the blower 507. As used herein, the term "blower" refers to a mechanical device for moving gas in a particular direction. For example, the blower 507 can be utilized to move gas through the aspirating smoke detector device 500. The blower 507 can, in some instances, comprise a ducted housing having a fan that, when spinning, causes gas (e.g., such as air) to flow in a particular direction.

The blower housing 506 is configured to receive the blower 507 when the blower 507 is oriented in a particular configuration. For example, the blower housing 506 can be designed such that the blower 507 can fit into the blower housing 506 in a single orientation. This can prevent the blower 507 from being installed in the blower housing 506 in an incorrect orientation.

The blower housing 506 can include a blower cover gasket 518. The blower cover gasket 518 can be formed on the blower housing 506 by, for instance, molding techniques. The blower cover gasket 518 can be, for example, a thermoplastic rubber gasket, among other examples.

The manifold 502 can additionally include the first sensor head housing 508-1. The first sensor head housing 508-1 can be connected to the blower housing 506 via the first flow channel 505-1 and can receive a first sensor head 509-1. As used herein, the term "sensor head" refers to a device to detect events and/or changes in its environment and transmit the detected events and/or changes for processing and/or analysis. For example, the sensor heads 509 can be utilized to detect smoke particles in gas transiting through the aspirating smoke detector device 500. In some examples, the first sensor head 509-1 can be a nephelometer (e.g., an aerosol photometer) to measure the concentration of smoke particles in a gas by utilizing light scattered by smoke particles. However, the first sensor head 509-1 can be any other type of smoke detection sensor that detects smoke utilizing gas transiting through the aspirating smoke detector device 500.

The first sensor head housing 508-1 can be configured to receive a first sensor head 509-1. That is, the first sensor head housing 508-1 is configured to receive the first sensor head 509-1 when the first sensor head 509-1 is oriented in a particular configuration. For example, the first sensor head housing 508-1 can be designed such that the first sensor head 509-1 can fit into the first sensor head housing 508-1 in a single orientation. This can prevent the first sensor head 509-1 from being installed in the first sensor head housing 508-1 in an incorrect orientation.

The first sensor head housing 508-1 can include a first sensor head housing cover gasket 520-1. The first sensor head housing cover gasket 520-1 can be formed on the first sensor head housing 508-1 by, for instance, molding techniques. The first sensor head housing cover gasket 520-1 can be, for example, a thermoplastic rubber gasket, among other examples.

Similar to the first sensor head housing 508-1, the second sensor head housing 508-2 can be connected to the blower housing 506 via the second flow channel 505-2 and can receive a second sensor head 509-2. The second sensor head 509-2 can be a nephelometer or any other type of smoke detection sensor that detects smoke utilizing gas transiting through the aspirating smoke detector device 500. Additionally, the second sensor head housing 508-2 can be configured to receive the second sensor head 509-2. That is, the second sensor head housing 508-2 is configured to receive the second sensor head 509-2 when the second sensor head 509-2 is oriented in a particular configuration. For example, the second sensor head housing 508-2 can be designed such that the second sensor head 509-2 can fit into the second sensor head housing 508-2 in a single orientation. This can prevent the second sensor head 509-2 from being installed in the second sensor head housing 508-2 in an incorrect orientation.

The second sensor head housing 508-2 can include a second sensor head housing cover gasket 520-2. The second sensor head housing cover gasket 520-2 can be formed on the second sensor head housing 508-2 by, for instance, molding techniques. The second sensor head housing cover gasket 520-2 can be, for example, a thermoplastic rubber gasket, among other examples.

Figure 6:
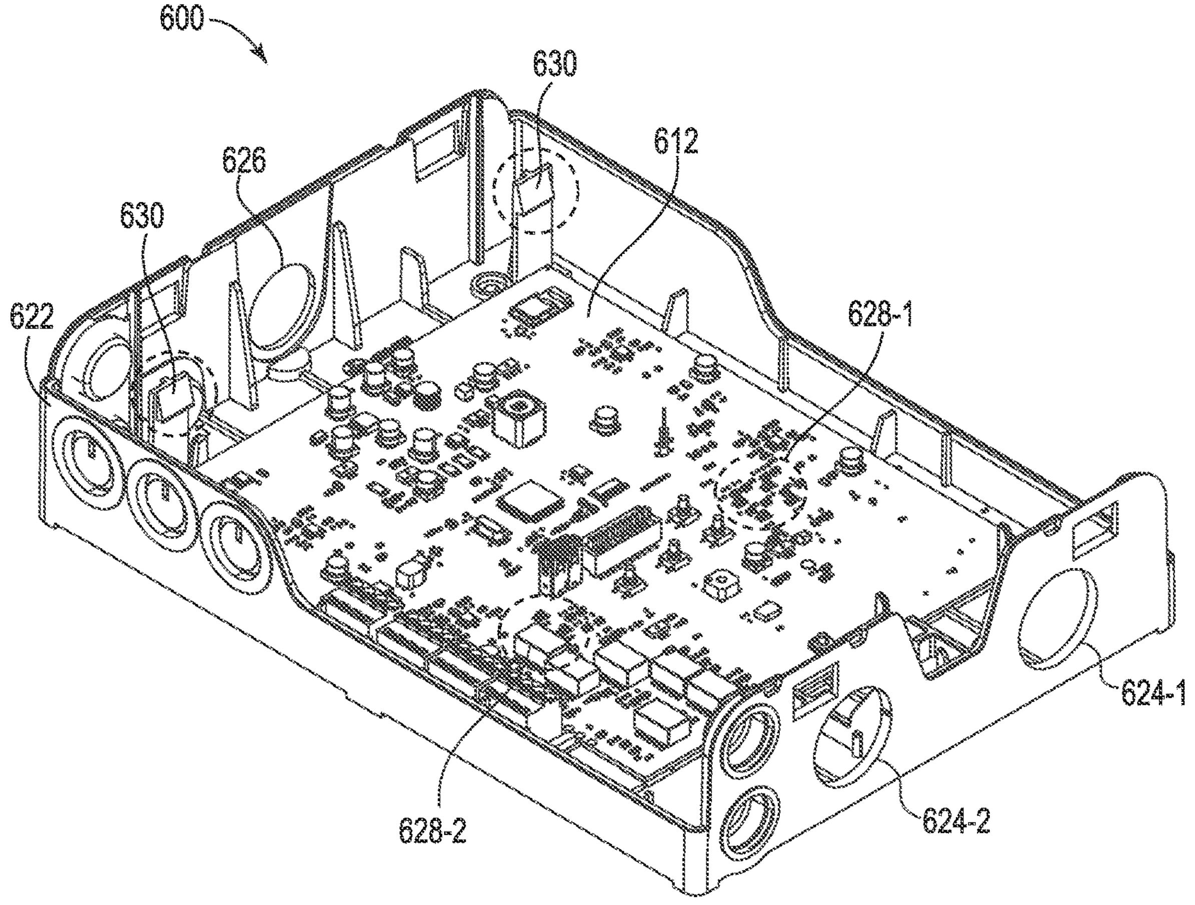
FIG. 6 is perspective view of an example of a housing and a PCB of an aspirating smoke detector device, in accordance with one or more embodiments of the present disclosure.

FIG. 6 is perspective view of an example of a housing 622 and a PCB 612 of an aspirating smoke detector device 600, in accordance with one or more embodiments of the present disclosure. The housing 622 can house the PCB 612, as is further described herein.

As illustrated in FIG. 6, the aspirating smoke detector device 600 can include a housing 622. As used herein, the term "housing" refers to an outer shell of a device. The housing 622 can be a "rear" housing of the aspirating smoke detector device 600 which can house the PCB 612. For example, the housing 622 can retain the PCB 612 after assembly of the aspirating smoke detector device 600. The PCB 612 can include LEDs 628-1 and 628-2. The LEDs 628-1 can be in a 2×2 array configuration to correspond with the 2×2 array configuration of the light pipes (e.g., light pipes 314-1, previously described in connection with FIG. 3) and the LEDs 628-2 can be in a 1×1 array configuration to correspond with the 1×1 array configuration of the light pipes (e.g., light pipes 314-2, previously described in connection with FIG. 3).

Although not illustrated in FIG. 6 for clarity and so as not to obscure embodiments of the present disclosure, the housing 622 can include a fastening mechanism. The fastening mechanism can retain the PCB 612 in the housing 622. The fastening mechanism can be, for example, a clamp(s), a snap clip, a mechanical fastener (e.g., a bolt, screw, etc.), among other types of fastening mechanisms.

Additionally, although not illustrated in FIG. 6 for clarity and so as not to obscure embodiments of the present disclosure, the housing 622 can include mounting locations. The mounting locations can include, for instance, a hole through which a fastener can secure the aspirating smoke detector device 600 to a wall or other object. The fastener can be secured to the wall or other object and slipped through the hole of the mounting location such that the housing 622 can rest on the fastener to mount the aspirating smoke detector device 600 to the wall or other object.

The housing 622 can include a first housing inlet 624-1, a second housing inlet 624-2, and a housing outlet 626. The first housing inlet 624-1, the second housing inlet 624-2, and the housing outlet 626 can be apertures in the structure of the housing 622. The first housing inlet 624-1 can receive a first sensor head housing inlet, the second housing inlet 624-2 can receive a second sensor head housing inlet, and the housing outlet 626 can receive a blower housing outlet, as is further described in connection with FIG. 7.

As illustrated in FIG. 6, the housing 622 can further include snap clips 630. As used herein, the term "snap clip" refers to a fastening mechanism including a protruding flange having an engagement tooth. The snap clips 630 can be deflected when an object to be secured is inserted adjacent to the snap clips 630 and an engagement tooth of each of the snap clips can engage with a surface of the object to secure the object, as is further described in connection with FIG. 7.

Figure 7:
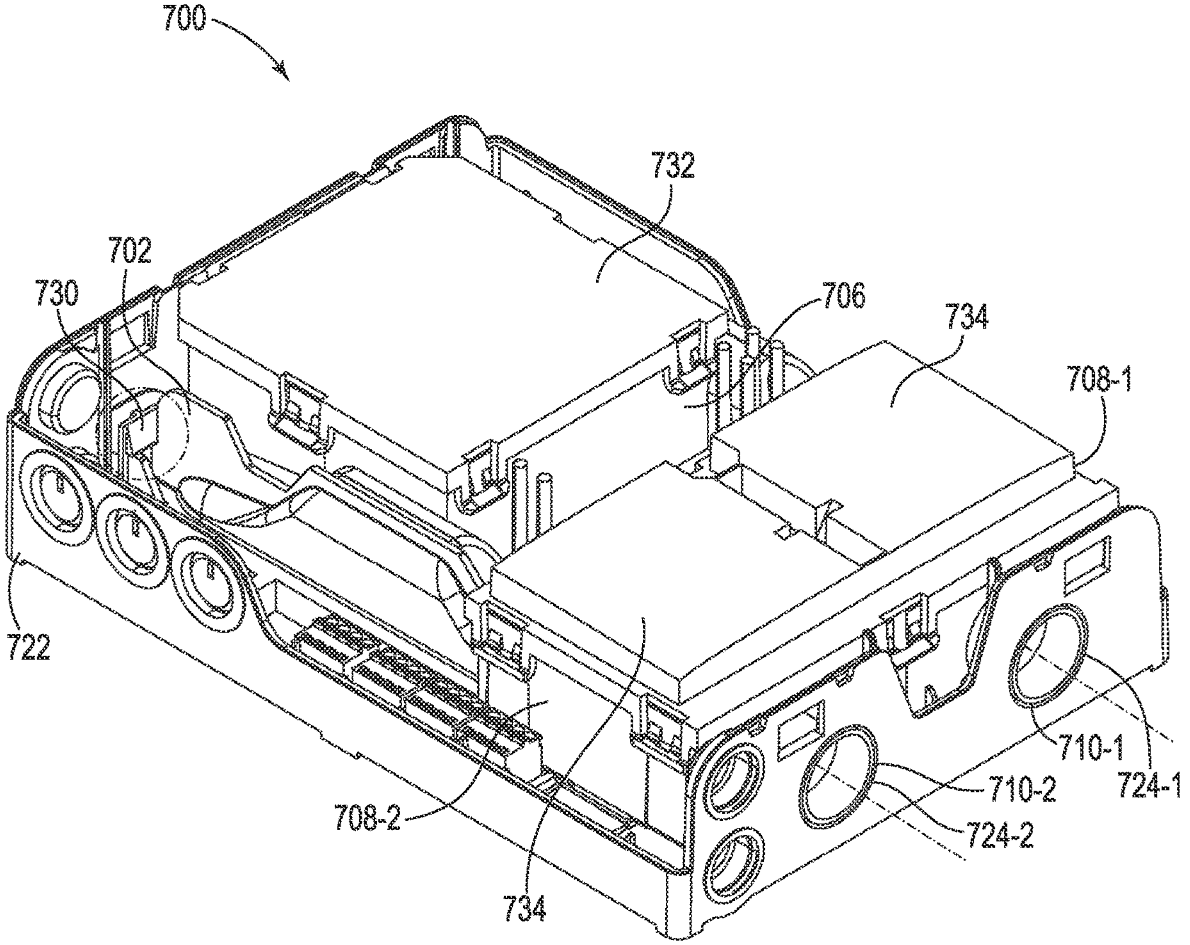
FIG. 7 is a perspective view of an example of a housing and a manifold of an aspirating smoke detector device having a blower housing cover and a sensor head housing cover, in accordance with one or more embodiments of the present disclosure.

FIG. 7 is a perspective view of an example of a housing 722 and a manifold 702 of an aspirating smoke detector device 700 having a blower housing cover 732 and sensor head housing cover 734, in accordance with one or more embodiments of the present disclosure. The manifold 702 can include a blower housing 706 and sensor head housings 708.

In the embodiment illustrated in FIG. 7, the aspirating smoke detector device 700 can be partially assembled. For example, the manifold 702 can be connected to the housing 722 via a snap clip (e.g., snap clip 630, previously described in connection with FIG. 6). The snap clip can be deflected when the manifold 702 is inserted into the housing 722 and an engagement tooth of the snap clip can engage with a surface of the manifold 702 to connect the manifold 702 to the housing 722.

When the manifold 702 is connected to the housing 722, the first sensor head housing inlet 710-1 can be coaxially located with the first housing inlet 724-1. Additionally, the second sensor head housing inlet 710-2 can be coaxially located with the second housing inlet 724-2. Further, although not illustrated in FIG. 7 for clarity and so as not to obscure embodiments of the present disclosure, a blower housing outlet can be coaxially located with the housing outlet (e.g., housing outlet 626, previously described in connection with FIG. 6). Accordingly, gas can flow into the aspirating smoke detector device 700 via the first sensor head housing inlet 710-1 and/or the second sensor head housing inlet 710-2, to the sensor heads located in the sensor head housings 708, through the flow channels, and out the blower housing outlet, during which time the sensor heads can determine whether the gas includes smoke particles.

In order to ensure the gas flowing through the aspirating smoke detector device 700 is not mixed with gas located outside the aspirating smoke detector device 700, the various housings comprising the manifold 702 can be fluidically sealed. For example, the blower housing 706 can receive a blower housing cover 732. As previously described in connection with FIG. 5, the blower housing 706 can include a cover gasket (e.g., blower cover gasket 518, previously described in connection with FIG. 5). When the blower housing cover 732 is connected to the blower housing 706, the blower cover gasket can fluidically seal the blower housing 706 to the blower housing cover 732.

Similar to the blower housing 706, the first sensor head housing 708-1 and the second sensor head housing 708-2 can receive a sensor head housing cover 734 to cover the first sensor head and the second sensor head respectively located therein. As previously described in connection with FIG. 5, the first sensor head housing 708-1 and the second sensor head housing 708-2 can include a cover gasket (e.g., first sensor head housing cover gasket 520-1, previously described in connection with FIG. 5). When the sensor head housing cover 734 is connected to the first sensor head housing 708-1 and the second sensor head housing 708-2, the sensor head housing cover gasket can fluidically seal the first sensor head housing 708-1 and the second sensor head housing 708-2 to the sensor head housing cover 734.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combinations of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An electrical connector, comprising:
- a spring having a plurality of coils and connecting a first printed circuit board (PCB) to a second PCB, wherein the spring includes:
  - a first portion in contact with the first PCB;
  - a second portion in contact with the second PCB; and
  - a third portion extending between the first portion and the second portion, and
- a spacer surrounding, and separated from, the third portion of the spring;
- wherein the spring is sealed from outside air.

2. The connector of claim 1, further comprising a seal seated in a groove of the spacer and in contact with the first PCB.

3. The connector of claim 1, further comprising a seal seated in a groove of the spacer and in contact with the second PCB.

4. The connector of claim 1, wherein the spring comprises a tinned phosphorous bronze material.

5. The connector of claim 1, wherein third portion of the spring has a first diameter, and wherein the first and second portions each taper from the first diameter to a second diameter.

6. The connector of claim 5, wherein the spacer includes an annular projection defining a retaining diameter, and wherein:
- the first diameter exceeds the retaining diameter; and
- the retaining diameter exceeds the second diameter.

7. The connector of claim 5, further comprising:
- a seal seated in a groove of the spacer and in contact with the second PCB,
- wherein the seal includes a retaining lip defining a lip diameter, and wherein:
  - the first diameter exceeds the lip diameter; and
  - the lip diameter exceeds the second diameter.

8. The connector of claim 1, further comprising:
- a first seal seated in a first groove of the spacer and in contact with the first PCB; and
- a second seal seated in a second groove of the spacer and in contact with the second PCB,
- wherein the spring is sealed from the outside air by the spacer, the first seal, the second seal, the first PCB, and the second PCB.

9. The connector of claim 8, wherein the second seal includes a plurality of fins, and wherein each of the plurality of fins is in contact with the second PCB.

10. A smoke detector device, comprising:
- a first printed circuit board (PCB);
- a second PCB; and
- a double conic spring partially compressed and electrically connecting the first PCB to the second PCB, wherein the double conic spring includes:
  - a first portion in contact with the first PCB;
  - a second portion in contact with the second PCB; and
  - a third portion extending between the first portion and the second portion; and
- a spacer surrounding, and separated from, the third portion of the double conic spring;
- wherein the double conic spring is sealed from outside air.

11. The device of claim 10, further comprising an additional double conic spring partially compressed and electrically connecting the first PCB to the second PCB, wherein the additional double conic spring includes:
- a fourth portion in contact with the first PCB;
- a fifth portion in contact with the second PCB; and
- a sixth portion extending between the fourth portion and the fifth portion.

12. The device of claim 10, wherein the spacer is a portion of a manifold of the device.

13. The device of claim 10, wherein the double conic spring is located in a lumen defined by an inner surface of an additional spacer between the first PCB and the second PCB.

14. The device of claim 10, wherein the first portion and the second portion each taper to a same diameter.

15. The device of claim 10, wherein the first portion tapers to a first diameter, and wherein the second portion tapers to a second diameter.

16. A method of manufacturing a sealed electrical connector, comprising:
- providing a spring configured to electrically connect a first printed circuit board (PCB) to a second PCB, wherein the spring includes:
  - a first portion configured to contact the first PCB;
  - a second portion configured to contact the second PCB; and
  - a third portion extending between the first portion and the second portion;
- inserting the spring into a spacer such that the spacer surrounds, and is separated from, the third portion of the spring;
- seating a first seal in a first groove of the spacer and a second seal in a second groove of the spacer; and
- bringing the first PCB nearer to the second PCB such that the first seal contacts first PCB and the second seal contacts the second PCB.

17. The method of claim 16, wherein the method includes compressing the first seal and the second seal.

18. The method of claim 16, wherein the spacer includes an annular projection defining a ledge, wherein the second seal includes a retaining lip.

19. The method of claim 16, wherein the method includes fastening a snap clip to maintain contact between the first seal and the first PCB and between the second seal and the second PCB.

* * * * *